United States Patent [19]

Kuhls et al.

[11] Patent Number: 4,774,304

[45] Date of Patent: Sep. 27, 1988

[54] MOLDING POWDER COMPRISING AGGLOMERATED PARTICLES OF PTFE COMPOUNDS

[75] Inventors: Jürgen Kuhls; Eduard Weiss, both of Burghausen; Gottfried Burgstaller, Burgkirchen, all of Fed. Rep. of Germany

[73] Assignee: Hoechst Aktiengesellschaft, Frankfurt am Main, Fed. Rep. of Germany

[21] Appl. No.: 21,168

[22] Filed: Mar. 3, 1987

Related U.S. Application Data

[60] Continuation of Ser. No. 885,247, Jul. 14, 1986, abandoned, which is a continuation of Ser. No. 738,532, May 24, 1985, abandoned, which is a continuation of Ser. No. 563,357, Dec. 20, 1983, abandoned, which is a division of Ser. No. 413,716, Sep. 1, 1982, Pat. No. 4,439,385.

[30] Foreign Application Priority Data

Sep. 9, 1981 [DE]  Fed. Rep. of Germany ....... 3135598

[51] Int. Cl.$^4$ ............................................. C08F 16/24
[52] U.S. Cl. ..................... 526/247; 264/37; 264/117; 428/402
[58] Field of Search ................. 428/402; 264/37, 117; 526/247

[56] References Cited

U.S. PATENT DOCUMENTS 4,379,900  4/1983  Sulzbach ............................ 526/247
4,408,007  10/1983  Kuhls ................................. 526/247

*Primary Examiner*—Paul R. Michl
*Assistant Examiner*—Patrick A. Doody

[57] ABSTRACT

A process for the continuous agglomeration of granular tetrafluoroethylene polymer powders which cannot be processed from the melt to give molding powders having a high bulk density, an improved powder flow and particle stability and a narrow particle size distribution is described. In this process, the powder to be agglomerated is first introduced uniformly into a pretreatment stage and is dispersed and pre-agglomerated in this stage in the liquid agglomeration medium, composed of water and an organic liquid capable of wetting polytetrafluoroethylene, is then agglomerated to the desired average particle diameter in an agglomeration stage and is finally treated further in an after-treatment stage in order to develop the final shape of the particles. Finally, the powder is separated from the liquid medium and is dried. This makes it possible to obtain, in an economical manner and with excellent processing properties, high-grade agglomerated molding powders of such tetrafluoroethylene polymers, in particular of such polymers which have been modified with small quantities of perfluoro-(alkyl-vinyl) ethers.

13 Claims, No Drawings

MOLDING POWDER COMPRISING AGGLOMERATED PARTICLES OF PTFE COMPOUNDS

This is a continuation of our copending application Ser. No. 885,247, filed July 14, 1986, which is a continuation of application Ser. No. 738,532, filed May 24, 1985 abandoned, which is a continuation of application Ser. No. 563,357, filed Dec. 20, 1983 abandoned, which is a division of application Ser. No. 413,716 filed Sept. 1, 1982 now U.S. Pat. No. 4,439,385.

The invention relates to a process for the continuous production of an agglomerated molding powder from a granular non-melt-fabricable tetrafluoroethylene polymer primary powder in which the average particle diameter $d_{50}$ of the primary particle is 20 to 80 $\mu$m, in a liquid medium which passes through the whole process and consists of water and an organic liquid which is capable of wetting such a tetrafluoroethylene polymer and is soluble in water to the extent of not more than 15% by weight, the weight/volume ratio of primary powder to organic liquid being 7:1 to 1.3:1 and the volume/volume ratio of organic liquid to water being 1:1.4 to 1:50, with mechanical agitation at temperatures of 5° to 90° C. The invention also relates to an agglomerated molding powder composed of a non-melt-fabricable tetrafluoroethylene polymer and has a specific surface area of 0.5 to 4 $m^2/g$, as measured by the BET method.

As is known, because of their extremely high melt viscosity, which does not permit the formation of a melt in the customary sense, it is only possible to process polytetrafluoroethylene powders (abbreviated below to PTFE for the homopolymer) further to give molded articles by special techniques, similar to those of powder metallurgy. Equivalent to them in this respect are those tetrafluoroethylene polymers which contain small quantities of a comonomer, in most cases a fluorine-containing comonomer which, in this sense, is in most cases known as a modifying agent, it being necessary to adjust this quantity to a level so low that the transition to a copolymer which can be processed from the melt, i.e. a true thermoplastic, is not yet reached.

Two types of PTFE powders are used in further processing, namely so-called fine powders, prepared by emulsion polymerization, and so-called granular powders, prepared by suspension polymerization, these two types differing from one another in principle in their particle structure, specific surface area and their powder and processing properties and also in their fields of use. The present invention is concerned with powders of the last-mentioned type, which are usually processed by methods which include metering into a mold, compression to give a preform and sintering the latter, the metering, in particular, being carried out substantially automatically. These methods set high requirements, in particular, for the bulk density, the pourability and the particle size distribution, which should be as narrow as possible, of such a molding powder.

These properties can only be achieved in rare and exceptional cases, using very special polymerization techniques, by crude polymers, such as are produced directly from the polymerization process. In addition, these polymers have an excessively high compactness of the particles and are therefore not suitable for compression-sintering processing, owing to their inadequate moldability and their low particle surface area. When such crude polymers, which, in the polymerization processes generally employed, are produced at particle sizes within the range from 300 to 3,000 $\mu$m, are finely ground, which is in most cases necessary, in order to reduce the average particle size, large proportions of fibrous particles are formed, whereby the powder flow and the bulk density are very considerably adversely affected.

It has therefore been known for a long time to improve the processability of such granular PTFE molding powders by so-called agglomeration processes (occasionally also described as granulation processes) in agitated liquid media by the action of mechanical forces. Liquid agglomeration media of this type which have been described are water (U.S. Pat. Nos. 3,366,615 and 3,766,133), organic liquids capable of wetting PTFE (U.S. Pat. No. 3,265,679) amino-substituted and/or hydroxyl-substituted alkanes (U.S. Pat. No. 3,532,782) or mixtures of water and organic liquids which are substantially insoluble in water (U.S. Pat. Nos. 3,527,857 and 3,781,258). An agglomeration of particles in the dry state has also been described (U.S. Pat. No. 3,766,133).

All these processes are designed as discontinuous processes, i.e. the batchwise charging, the agglomeration and the discharging of the product from a single treatment vessel take place successively. A simple conversion of such an agglomeration process into a fully continuous operation runs into considerable difficulties, since the quality of the agglomerated PTFE molding powder obtained falls off rapidly. This is probably due to the fact that, in the course thereof, the mechanical agitation required for the agglomeration superimposes itself in an undesirable manner onto the flow motion of the powder suspended in the liquid medium as a continuum, as a result of which portions of product are discharged which have not yet passed through the agglomeration process to reach full "maturity" and therefore do not yet have the properties desired, which then impairs the pattern of properties of the entire product.

On the other hand, a fully continuous process would be very desirable for economic reasons, if it were possible to adjust the properties of the agglomerated PTFE powders produced thereby to those obtained from discontinuous processes, or even to improve them further, and if it were also possible to produce the agglomerated PTFE powder in a uniform product quality. Some processes which have been disclosed hitherto, in which reference has been made to the possibility of continuous operation or which operate completely continuously, are still very unsatisfactory in this respect. Thus, U.S. Pat. No. 3,597,405 describes a method of continuous agglomeration in a vessel in which, using discs rotating at high speed, drum treatment is carried out on a powder which has been merely moistened with water and an organic liquid. The disadvantages of this procedure are the low capacity of the vessel, necessary to avoid the formation of oversize particles as a result of excessive mutual contact between particles, and also the blockages which occur in the initial grinding and screening carried out in a moist condition. The formation of a fairly large proportion of oversize particles cannot, however, be prevented; the resulting bulk density is relatively low ( 600 g/l). German Offenlegungsschrift No. 2,218,240 and U.S. Pat. No. 4,123,606 describe a two-stage Procedure which is similar in principle and in which a higher specific stirring energy is used in the first stage than in the subsequent second agglomerating stage, as a result of which a fairly hard shell is stated to be produced on the outer surface of the agglomerate. Although carrying out the process described in German Offenlegungsschrift No. 2,218,240 results in a reduction of the fine fraction, the coarse fraction in the second stage is increased in an undesirable manner as a result of mutual contact between the particles at low stirring energies. This disadvantage is overcome by the improvement described in U.S. Pat. No. 4,123,606, by fractionating the coarse fraction by screening and recycling it after it has passed through an additional comminution stage. However, it proves to be a disadvantage in this procedure that the wet screening of the agglomerate, which is moist with water and wetted with gasoline, results in blockage caused by the particles of agglomerate, which contain gasoline and are therefore very soft. Furthermore, it is necessary to pass a not inconsiderable part of the product through this comminution plant and thus to recycle it. The object of providing a fully continuous agglomeration process powders composed of non-melt-fabricable TFE polymers which forms the subject of the present invention, has, therefore, not yet been solved in a satisfactory manner, according to the state of the art.

This object is achieved in accordance with the invention by a process of the type mentioned initially, which comprises passing the primary powder, together with the liquid medium, through a three-stage cascade in which, initially, the primary powder, the water and the organic liquid, in the ratio mentioned, (a) are continuously introduced into a pretreatment stage filled with the liquid medium and are moved forward in the former stage, where the primary powder is first drawn in a conveying zone into the liquid medium, and is suspended in the latter, by means of a stirring element which effects the conveyance, then arrives is a directly adjacent dispersing zone and is there converted, by the action of a stirring element having a dispersing action within the range of the specific stirring energy applied, into a form which is essentially uniformly finely distributed within the liquid medium, then arrives in a directly adjacent homogenizing zone and is pre-agglomerated there by the action of a turbine-shaped stirring element to give secondary particles having an average particle diameter $d_{50}$ of about 100 to about 400 μm, the pretreatment stage being passed through at an average dwell time of 3 to 30 minutes and the specific stirring energy introduced there being 5 to 100 W/l, this pretreated suspension then (b) passes through an agglomeration stage in which the pre-agglomerated primary powder is further agglomerated by the gentle action of stirring elements which, within the range of specific stirring energy applied, exert essentially no comminuting action, producing an adequate contact between particles in the liquid medium, to give a powder having tertiary particles of an average particle diameter $d_{50}$ of 150 to 1,000 μm, the agglomeration stage being Passed through at an average dwell time of 5 to 50 minutes and the specific stirring energy introduced there being 2 to 30 W/l, this suspension then (c) is passed through an after-treatment stage in which, by maintaining an average dwell time of 6 to 60 minutes and by the action of a multi-bladed stirring element which introduces a specific stirring energy of 5 to 30 W/l into the suspension, the final formation of the particle shape takes place without a further essential change in the average particle size, and finally (d) is discharged continually from the after-treatment stage, and the agglomerated powder is separated from the liquid medium in a known manner.

The starting materials for the process according to the invention are the granular suspension polymers of tetrafluoroethylene which are prepared in a known manner and which are obtained, in the presence of catalysts which form free radicals, by customary processes such as were first disclosed in U.S. Pat. No. 2,393,967 and have since been modified in many ways. The suspension polymerization can also be carried out in the presence of modifying comonomers. Such modifing comonomers are well known to those skilled in the art. They include, for example, perfluoroalkenes having 3 to 6 C atoms, such as, in particular, hexafluoropropylene, and also perfluoro-(alkylvinyl) ethers having perfluoroalkyl groups containing 1 to 4 C atoms, such as, in particular, perfluoro-(n-propyl-vinyl) ether, and also ethylenically unsaturated monomers which also contain, in addition to fluorine, other groups, such as, for example, chlorine or hydrogen, such as, for example, chlorotrifluoroethylene. The preparation of such suspension polymers is described, for example, in U.S. Pat. Nos. 3,331,822, 4,078,134 and 4,078,135, in British Pat. No. 1,116,210 and in German Offenlegungsschrift No. 2,325,562.

Accordingly, the expression "non-melt-fabricable TFE polymers" embraces both the homopolymer of tetrafluoroethylene and also copolymers in which the modifying comonomer is present in such small proportions that the characteristic "non-melt-fabricable" is retained. Modified TFE polymers of this type have an apparent melt viscosity of $\geq 0.1$ Gpa s, often of $\geq 1$ Gpa s, it being possible for this value to increase in the case of modified polymers to values around 100 Gpa s or higher, and in the case of the homopolymer to values of 900 Gpa s. The expression "non-melt-fabricable" relates in this context to the customary methods of processing true thermoplastics. The apparent melt viscosity (shear viscosity) is determined by the method (creep test) of Ajroldi et al, described in J. Appl. Polym. Sci., 14 (1970), pages 79 et seq. This method is described in more detail in U.S. Pat. No. 4,036,802, column 9, line 46, to column 10, line 41. In the measurements in this Application, the method was modified as follows: determination of elongation at 350° C.; test specimen 0.25 cm wide, 0.65 cm thick and having a measured length of 3.5 cm on elongation.

Before the agglomeration according to the invention, the powders are subjected in a known manner to fine-grinding in order to reduce their average particle size to the desired range of 100 μm, which is generally effected in a hammer mill, an air jet mill or the like. The powders thus obtained from said non-melt-fabricable TFE polymers will be designated primary powders below. They are in an unsintered form. As suspension polymers, they have a specific surface area of 0.5 to 4 m²/g, preferably 1 to 2.8 m²/g. This property is also retained in the agglomerated product of the process according to the invention. The specific surface area mentioned is determined by the method of Brunauer, Emmet and Teller, described in J. Amer. Chem. Soc., 60 (1938), page 309 (BET method) Even if, as a result of the grinding, these primary powders have a certain proportion of fibrous particles, they have in principle, as suspension polymers, a granular morphology and differ fundamentally in this respect from emulsion polymers which have been prepared in the presence of such large quantities of emulsifier that they remain in a colloidal dispersion in the aqueous medium after the completion of the polymerization. The so-called fine powders obtained from such colloidal dispersions by precipitation are composed of agglomerates of colloidal primary particles having an average particle diameter of about 0.1 to 0.5 μm. They have a specific surface area which is usually greater than 9 m$^2$/g, and in general, as is known to those skilled in the art, they cannot be shaped by the above-mentioned techniques, nor could they be even if they contained modifying agents.

The organic liquid present in the liquid medium within the scope of the continuous process according to the invention should be able to wet the TFE polymer primary powder which cannot be processed from the melt and, as far as possible, should not be miscible with the water which is present at the same time, i.e. this organic liquid should, at the selected operating temperature of the process, within the range described below, have a surface tension of not more than about 40 mN/m and should be soluble in water to the extent of not more than 15% by weight, preferably not more than 2% by weight. Organic liquids of this type and suitable for such agglomeration processes are well known to those skilled in the art, so that a list of examples will be sufficient. The following may be mentioned as examples:

Alkanes and cycloalkanes, such as pentane, hexane or cyclohexane, aromatic hydrocarbons, such as benzene, toluene or xylene, mixtures of hydrocarbons, such as gasoline or kerosene fractions and mixtures thereof within a suitable boiling range, halogenated hydrocarbons, such as perchloroethylene, trichloroethylene, chloroform or chlorobenzene, or fluorinated chlorinated hydrocarbons or fluorochlorocarbons, such as, for example, trifluorotrichloroethane.

The continuous process according to the invention which is described below is carried out at temperatures of 5° to 90° C., preferably 15° to 70° C. and, particularly preferably, at 30° to 60° C. Depending on the operating temperature selected, the organic liquid mentioned should have a boiling point which is at least 10° C., preferably at least 20° C., higher than this selected operating temperature. Advantageously, the boiling point should not exceed 150° C.—although this is possible in principle—since the removal of the organic solvent from the agglomerated powder formed is then rendered difficult.

The second constituent of the liquid agglomerating medium is water, which is advantageously used in a deionized form.

The mixing ratio between parts by volume of organic liquid and parts by volume of water is 1:1.4 to 1:50, preferably 1:4 to 1:25.

In the continuous process according to the invention, the primary powder to be agglomerated, which has an average particle d$_{50}$ of 20 to 80 μm, preferably 20 to 50 μm, passes through, in series, a three-stage cascade. The terms cascade and stage used here are intended to describe spaces of different treatment action which are advantageously housed in separate vessels, although this is not absolutely necessary. The term zone within the pretreatment stage is, on the other hand, to be understood as meaning treatment spaces which are admittedly not absolutely necessarily located in the same vessel, but are certainly advantageously so arranged, the spaces of action of these zones being at least in contact with one another, but preferably overlapping slightly.

The vessel comprising the pretreatment stage is first filled with the liquid medium, and preferably also with the primary powder suspended therein, for example by first carrying out discontinuously, until the steady state of a continuum has been reached, the process described below in the manner in which it takes place in the pretreatment stage. The same procedure can also be followed in the succeeding stages. In this pretreatment stage, which is housed in a vessel of elongated shape which is preferably arranged vertically and through which the flow is vertical, the primary powder, the water and the organic liquid are metered in carefully and uniformly in the selected proportions. Uniform metering of the primary powder onto the surface of the agitated liquid medium is of great importance for the process according to the invention. It is advantageous to employ a metering hopper equipped with a discharging device having an equalizing action. A metering hopper of this type is described, for example, in German Pat. No. 1,531,934. From the outlet of this metering bunker, the primary powder to be metered in passes, either direct or via a storage vessel, to a feeding device, for example a vibratory chute, from which it is then conveyed into the pretreatment stage.

The two components of the liquid medium, namely, the organic liquid and the water, can be added separately. Preferably, however, these two components are introduced in a premixed form, which can be effected, for example, in a static mixer in the inlet line or in a stock vessel equipped with a stirrer, and, specifically, they are preferably introduced into the conveying zone or into the region of the latter which overlaps with the dispersing zone. The ratio between the organic liquid and water and also that between organic liquid and primary powder, which is set when metering into the pretreatment stage, is maintained throughout the whole of the process according to the invention; subsequent metering of a component is generally not necessary, unless it is necessary to compensate for losses of organic liquid which can take place as a consequence of working at temperatures near the boiling point of this organic liquid.

The ratio set in this metering between primary powder and organic liquid (parts by weight to corresponding parts by volume, for example kilograms/liters or a multiple thereof) is 7:1 to 1.3:1, preferably 4:1 to 1.6:1.

In the conveying zone, the powder which has been applied to the surface of the liquid in the pretreatment stage comes under the influence of a stirring element which effects conveyance in the direction of flow of the continuum, as a result of which the powder is drawn into the liquid medium and becomes suspended in the latter. Propeller stirrers of all known embodiments are pre-eminently suitable as such stirring elements which effect conveyance, but inclined blade stirrers with obliquely mounted blades or vanes of a rectangular shape, if appropriate cambered, in a propeller-like arrangement are secondarily suitable. Under the influence of such conveying stirrer elements, the suspended primary powder arrives in the directly adjoining dispersing zone and there comes into the region of action of a stirring element which exerts a dispersing action in the pretreatment stage, within the range of the specific stirring energy applied. A stirring element of this type, having a dispersing action, is preferably shaped in the form of a disc and has, for example in the peripheral region of the disc, angular elements, such as teeth or rectangular blades, mounted tangentially on both sides.

In addition to such stirring elements of the type of the so-called dispersing disc, it is also possible to use, for example, so-called disc stirrers in which angular elements of this type are mounted radially on both sides of the plane of the disc. In this dispersing zone, the powder is brought into a state in which it is essentially uniformly finely distributed within the liquid medium, being in this finely distributed state still for the most part in the primary particle size. An intimate contact is also set up with the organic liquid which is finely distributed in the water, as a result of which substantial proportions of this organic liquid are absorbed by the powder. This homogenizing process is completed in the homogenizing zone directly adjacent thereto, and, at the same time, a pre-agglomeration sets in, in which average particle sizes $d_{50}$ of about 100 to about 400 μm are reached in these resulting secondary particles—depending on the average particle size of the primary powder and on the temperature and composition of the liquid medium. This is effected by stirring elements which are preferably constructed as turbine-shaped stirring elements, in the extended meaning of these words. These preferably include stirring elements in the embodiment of an open or closed turbine, i.e. a turbine which is covered on one side or two sides, but, for example, the so-called double centrifugal stirrer is also suitable. Since the homogenizing zone and the dispersing zone overlap to a certain extent, and also supplement one another, in their action on the primary powder, and also, in particular, in relation to preventing the formation of oversize particles or the comminution of oversize particles which have already been formed, the stirring equipment employed in the homogenizing zone can also be used in the dispersing zone if its dispersing action is adequate.

In order to safeguard the action of this stirring, the entire pretreatment stage is equipped with an adequate number of flow breakers, unless the stirring elements of the individual zones, which are preferably mounted on a common shaft, are arranged excentrically in the vessel of the pretreatment stage. An average dwell time of the suspension in the whole pretreatment stage of 3 to 30, preferably 5 to 15, minutes, should be provided; the specific stirring energy introduced amounts to a total of 5 to 100, preferably 10 to 60, W/l of suspension.

The product leaving the pretreatment stage has a bulk density which is already distinctly higher, but is still not adequate, and a powder flow and particle stability which are still far from adequate. It is now introduced into the agglomeration stage, during which the actual formation of the agglomerate takes place. The pre-agglomerated particles are further agglomerated here, in a vessel of elongated shape which is preferably mounted vertically, by gentle action applied by stirring elements which, in the range of specific stirring energy applied, exert essentially no comminuting action, while producing an adequate contact between the particles in the liquid medium, to give a powder which is suspended in the liquid medium and has tertiary particles of an average particle diameter $d_{50}$ of 150 to 1,000 μm, in the course of which the desired degree of agglomeration is already reached. Even if the action of a single such stirring element can be adequate in some cases, it is preferable, because of the more uniform action, to employ at least two such stirring elements, there being no upper critical limit if the vessel has an adequate length. For reasons of economy and design, however, the number of these stirring elements is usually limited to 8, preferably 6, depending on the length of the vessel. Their individual regions of action should at least touch one another, and preferably overlap. If they are—preferably—mounted concentrically, it is also necessary to provide an adequate number of flow breakers here. The specific stirring energy introduced by this stirring equipment should be 2 to 30, preferably 5 to 20, W/l; the average dwell time in stage (b) should be 5 to 50, preferably 8 to 20, minutes. Stirring elements which do not have a comminuting action in this region are, preferably, all types of propeller stirrers, but also inclined blade stirrers, inclined paddle stirrers or cross-paddle stirrers, and combinations of such stirrers can also be employed. The product leaving the agglomeration stage not only already has the degree of agglomeration which is desired and adequate, but also has the desired narrow particle size distribution, but its bulk density, power flow and particle stability are not yet completely adequate. In order to improve these and to establish the pattern of properties finally, the suspended and agglomerated powder from the agglomeration stage (b) is fed to an after-treatment stage (c). Although the processes taking place in the individual stages cannot be explained in the fullest detail, it is nevertheless assumed that a rounding and densification of the agglomerated particles formed takes place in the after-treatment stage without significant alteration in the average particle diameter $d_{50}$ of the agglomerates being effected. This after-treatment stage takes place in a long, straight vessel, advantageously having a length to diameter ratio of at least 2:1, it being possible to reach very high ratios of this kind, such as, for example, 25:1, preferably 10:1, in a single vessel, or even up to 50:1 (total length to diameter), if the after-treatment stage is divided into several vessels of the said type arranged in series. This vessel or these vessels can be mounted vertically, but this makes it necessary to introduce flow-delaying elements. A horizontal arrangement is preferred—particularly in the case of a single long vessel. In this vessel there is a multi-bladed stirring element, formed from a large number of stirrer rings arranged in series—preferably on one shaft—each of these stirrer rings being composed of at least 3 and not more than 8, preferably not more than 6, blades and these stirring blades having a configuration of the type of a disc stirrer, i.e. having a rectangular shape and their rectangular planes being arranged radially on the shaft. A slightly inclined position in relation to the shaft is possible. The number of these serially arranged stirrer blade rings of the type of a disc stirrer depends on the length of the vessel, and the interspace between two such rings should not exceed the width of the stirrer blades. If several vessels are arranged in series, it is also possible to have an assembly on separate shafts, each of which is effective for one of these vessels.

In the whole after-treatment stage, a specific stirring energy of 5 to 30, preferably 10 to 20, W/l is introduced; the dwell time is 6 to 60, preferably 10 to 20, minutes.

After passing through the after-treatment stage (c), the agglomerate suspended in the liquid medium is withdrawn continuously and fed to a continuously operating filtering device in order to separate the agglomerated powder from the bulk of the water and from part of the organic liquid, and such a filtering device should, if possible, permit the recovery of the organic liquid employed. The removal of the remainder of the water and of the remaining organic solvent is effected by drying, preferably in several successive drying stages and, if appropriate, using a vacuum, it being necessary for the drying to be carried out at temperatures below the crystallite melting point, and it is advantageously carried out at a temperature at least 50° C. above the boiling poitt of the organic liquid employed. The drying is preferably effected at a temperature of 25° to 300° C.—in the case of stagewise drying this temperature is preferably employed in the last stage.

After the drying, the coarse fraction, i.e. oversize particles having a diameter 1,500 μm, is removed by means of suitable screening. In the product of the process according to the invention, this coarse fraction is not more than 4% by weight, but is very frequently below 1% by weight, a percentage which can scarcely be achieved in the discontinuous process. The temperature for the whole continuous agglomeration process according to the invention, which can be selected within the abovementioned range, is preferably kept approximately constant from stage (a) to stage (b) within a controllable width of variation. Differing temperatures are possible, in which case it is preferable to have an increase in temperature in the direction of flow.

Customary fillers, in an amount of 1 to 60% by weight, can be mixed into the primary powder before it is metered into the pretreatment stage (a). Examples of fillers of this type are glass fibers which, if appropriate, have been treated with customary water-repelling agents, powdered carbon, graphite, molybdenum sulfide, bronze, asbestos and the like. These fillers are mixed homogeneously in a dry state into the primary powder in a premixing vessel, before metering into the process according to the invention takes place. The said water-repelling agents, such as, for example, silane coupling agents, can, if appropriate, also be added to the agglomeration process in the pretreatment stage. In the course of the agglomeration the filler is incorporated homogeneously into the agglomerated particles.

In a preferred embodiment of the process, a part of the pretreated suspension, after it has passed through the homogenization zone in the pretreatment stage, is extracted from the flow and returned via a circulating line to the pretreatment stage, if appropriate by means of a pump, which can perhaps also contribute an additional comminuting and/or homogenizing action. The ratio of the fraction recycled to that passing through is preferably between 1:1 and 5:1.

The process according to the invention for the agglomeration of non-melt-fabricable TFE polymer powders makes it possible to produce, in a continuous procedure, agglomerated powders of this type, the product properties of which are at least of equal rank with, but in some cases far superior to, the powders originating from discontinuous processes. The agglomerates are obtained in a uniform product quality, especially in respect of their bulk density, their narrow particle size distribution, their improved powder flow and their particle stability. The process according to the invention is, however, considerably more economical and cost-advantageous to operate than discontinuous processes; it offers the possibility of automatic control in whole or in part. In addition numerous manual working stages are avoided, so that the risk of spotlike impurities is virtually excluded. This fact is of very particular importance in the case of TFE polymers, since such impurities can occur as visible black spots when the product is sintered, and additionally, for example, effect the formation of electrical pores and thus reduce the dielectric strength of insulations.

It has already been stated many times in the literature that modified TFE polymers were subjected to an agglomeration process. However, it has been found that, particularly in the case of perfluorinated ethers as modifying agents, it is only possible by such processes to obtain products which are not equivalent to the unmodified polymers belonging to the state of the art, particularly in regard to their powder flow, their bulk density and their particle stability. It has become possible, by the process according to the invention, for the first time to prepare, with the same advantageous properties, such TFE polymers which have been modified with perfluorinated ethers.

The invention also relates, therefore, to agglomerated molding powders composed of particles of a non-melt-fabricable tetrafluoroethylene polymer, which has a specific surface area, determined by the BET method, of 0.5 to 4 m²/g and which (a) contains 0.001 to 1% by weight of copolymerized units of a perfluorinated vinyl ether of the formula

in which X denotes a perfluoroalkyl radical having 1 to 4 C atoms or a radical of the formula

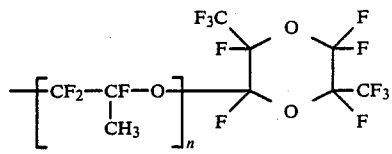

and n is 0 to 1, and also contains copolymerized units of tetrafluoroethylene, (b) is composed essentially of agglomerates having an average particle diameter $d_{50}$ of 150 to 1,000 μm which have been built up from primary particles having an average particle diameter $d_{50}$ of 20 to 80 μm and which possess a spheroidal form and a uniform, dense surface, (c) has a bulk density of at least 700 g/l, (d) has a power flow time of 8.0 to 4.0 seconds/50 g at an average agglomerate diameter $d_{50}$ of 150 to 250 μm and of 4.0 to 1.5 seconds/50 g at an agglomerate diameter $d_{50}$ of 250 to 1,000 μm, (e) has a particle stability of 8.0 to 4.0 seconds/50 g at an average agglomerate diameter $d_{50}$ of 150 to 250 μm and of 4.0 to 1.8 seconds/50 g at an agglomerate diameter $d_{50}$ of 250 to 1,000 μm, and (f) has a proportion of more than 50% by weight of agglomerates having a particle size diameter which is at least 0.7 times and not more than 1.3 times the average particle diameter $d_{50}$, (g) wherein a molded article prepared therefrom has a welding factor of at least 0.60, and (h) the pore count, measured at a voltage of 5,000 V as electrical defects on a veneer-cut film 200 μm thick prepared from the agglomerated molding powder, is not more than 15 pores/m².

The said powders preferably contain a proportion of 0.01 to 0.5% by weight of the said perfluorinated ethers, and have an average particle diameter of the agglomerates of 150 to 800 μm, in particular 250 to 750 μm, an average particle diameter of the primary particles in the agglomerates of 20 to 50 μm, a bulk density of 700 to 1,000, in particular 800 to 1,000, g/l, a power flow time of 6.0 to 3.0 seconds/50 g at $d_{50}$ of 150 to 250 μm and of 3.0 to 1.5 seconds/50 g at $d_{50}$ of 250 to 1,000 μm, and a particle stability of 6.0 to 3.0 seconds/50 g at $d_{50}$ of 150 to 250 μm and of 3.0 to 1.8 at $d_{50}$ of 250 to 1,000 μm. The proportion of agglomerated particles having a diameter within 0.7 times to 1.3 times the average particle diameter $d_{50}$ is preferably 50 to 75, particularly preferentially 60 to 75% by weight, the welding factor is preferably 0.6 to 1.0, particularly preferably 0.80 to 1.0, and the pore count is 15 to 0, preferably 6 to 0, pores/$m^2$. They also have a deformation under load, determined as specified in ASTM D-621 on test specimens prepared therefrom, of not more than 15 (down to 5), preferably 12 to 5%.

The agglomerated molding powders according to the invention, which are composed of particles of a tetrafluoroethylene polymer which cannot be processed from the melt, and which have the said content of copolymerized units of the perfluorinated vinyl ethers indicated, are distinguished, above all, by very good electrical insulation properties. Thus, they have a surprisingly high electrical breakdown strength, which manifests itself, above all, in the number of pores counted per square meter of a veneer-cut film 200 μm thick. Whereas in the case of agglomerated molding powders of tetrafluoroethylene, i.e. those containing no modifying agent, a considerable decrease in the pore count, compared with the finely ground starting powder, takes place as an undesirable consequence of the agglomeration process, this is the case only to a very small extent in the agglomeration leading to the modified molding powders according to the invention. The agglomerated molding powders according to the invention, which contain the said perfluorinated vinyl ethers as modifying agents, are therefore far superior in this respect to the conventional molding powders which have been agglomerated but not modified.

The finely divided, agglomerated molding powders (up to 240 μm) which are obtained by the process according to the invention are particularly suitable for the production of veneer-cut films for isostatic compression molding and for the production of sheets. The agglomerates of somewhat coarser particle size (above 250 μm) are employed in the automatic compression molding of thin-walled components, such as, for example, sheets, rods and tubes, but also for ram extrusion (for example in the low pressure range).

The following methods of determination have been used in connection with this invention:

(1) Average particle diameter ($d_{50}$)

The determination is effected by sieve analysis as specified by DIN Standard 53,477, in a vibration time of 10 minutes, the coarse fraction having particle diameters >1,500 μm being left out account in determining the average particle diameter $d_{50}$.

(2) Determination of the coarse fraction

The coarse material is removed by screening using a 1,500 μm sieve and the fraction is quoted in % by weight (table II).

(3) Bulk density

The determination is carried out as specified in DIN Standard 53,468, after removing the coarse fraction (having a particle diameter greater than 1,500 μm).

(4) Powder flow

A polytetrafluoroethylene-coated aluminum funnel having an internal diameter (at the top) of 74 mm, an internal diameter (at the bottom) of 12 mm and a height of 89 mm is fastened to a commercially available vibrator in such a way that the distance from the motor casing of the vibrator to the center of the funnel is 90 to 100 mm. 50 g of product are placed in the funnel, the vibrator is switched on at an amplitude of vibration of 0.1 to 1 mm and the time from releasing the funnel aperture until the funnel has run itself completely empty is measured. The shorter the flow time, the better the powder flow of the powder. The coarse fraction >1,500 μm is removed before measuring the pourability.

(5) Particle stability 50 g of powder are placed in an aluminum beaker having an internal diameter of 100 mm and a height of 150 mm, and are stirred for 5 minutes at 200 r.p.m. The stirrer, which is equipped with two vanes, is aligned via a pin and a corresponding recess in the base of the beaker. The distance from the lower edge of the stirrer blade to the base is 1.5 mm. The stirrer blades have a thickness of 1.5 mm, a width of 25 mm and a length of 46 mm and are inclined at an angle of 45° to the stirrer shaft and at an angle of 90° to one another. The edges of the vane blades are slightly rounded. Approximately 0.1 g of aluminum oxide is added to the product before stirring is begun in order to avoid the development of an electrostatic charge. In this determination too, the coarse particles 1,500 μm are removed beforehand. The powder flow, as defined under (4), of the product which has been stirred in the aluminum beaker is then measured. This value of power flow, obtained after exposure to mechanical stress, is used as a measure of the particle stability. Comparing the powder flow values of the powder before and after the stirring treatment provides information as to how far the particles have been destroyed in the course of the exposure to mechanical stress.

(6) Determination of the proportion by weight of the particles having 0.7 times to 1.3 times the diameter of the $d_{50}$ value This is effected by calculating the 0.7 times value and the 1.3 times value from the $d_{50}$ value by multiplication and determining the proportion by weight by plotting the points in a cumulative curve.

(7) Determination of the perfluoro-(alkylvinyl) ether (PAVE) content

The PAVE content of the polymers prepared in accordance with the invention can be determined by a mass balance by measuring the total quantity fed to the reactor, less the quantity of monomeric PAVE remaining in the reactor after the polymerization.

An analytical method using IR spectroscopy is also available for determining the perfluoro-(propyl vinyl) ether content in the polymer and is described in detail in German Offenlegungsschrift No. 2,416,452.

(8) Specific stirring energy

The power input of the stirring elements in watts is measured at various speeds of rotation, in each case while the vessel is empty. The liquid medium, of the quantity and type required in accordance with the process according to the invention for the steady state of a continuum, is then added and the measurement is repeated. The specific stirring energy for a given stirrer speed of rotation is then calculated as follows:

$$\text{Specific stirring energy (W/l)} = \frac{L_{(full)}\ (W) - L_{(empty)}\ (W)}{\text{capacity (liter)}}$$

where $L_{(full)}$ and $L_{(empty)}$ are the power inputs in watts measured at a specific speed of rotation in the full and empty condition of the vessel.

(9) Specific surface area

This is determined using an apparatus of the Areatron type (manufacturer: Leybold, Cologne) by the method of s. Brunauer, P. Emmet and E. Teller; see J. Amer. Chem. Soc., 60 (1938), page 309 (BET method).

(10) Pore count

A solid cylindrical block of the agglomerated molding powder having a diameter of 100 mm and a height of 120 mm is prepared by compression molding in a cylindrical mold under a pressure of 35 N/mm$^2$. This block is then sintered by first bringing it to a temperature of 380° C. at a rate of heating of 45° C./hour, keeping it at this temperature for 4 hours and then cooling it at a rate of 45° C./hour. A film 200 μm thick is then veneer-cut from this block. This veneer-cut film, which is 120 mm wide and 200 μm thick, is passed over a system of rollers, along an aluminum foil to which a direct current potential of 5,000 volts is applied. The opposite roller is earthed. 1 m$^2$ of the film is measured. The pore count is recorded by means of a counting mechanism. The result is quoted in number of pores/m$^2$.

(11) Deformation under load

This is determined as specified in ASTM-D 621 at 20° C. on circular test specimens having a diameter of 10 mm and and a thickness of 10 mm.

(12) Welding factor

Solid cylinders of the agglomerated molding powder having a diameter of 45 mm and a length of 45 mm (weight 150 g) are compression molded under a pressure of of 15 N/mm$^2$. Two each of these cylinders are sintered without loading in a glass tube of 48 mm diameter, as follows:

8 hours, heating up from 20° to 380° C. at a linear rate of heating of 45° C./hour, this temperature being maintained for 4 hours, and 8 hours cooling from 380° C. to 20° C. at a linear rate of cooling of 45° C./hour.

This sintering and cooling process is repeated. Test specimen having a diameter of 20 mm in the center (outside the region of clamping) are turned from the welded articles thus obtained. Comparison specimens which are not welded (i.e. are compression molded from the outset in the full length of 90 mm) are prepared in an identical manner. These test specimens are subjected to a tensile test in order to determine the tensile strength at break, following the guidelines of DIN Standard 53,455 and working at a drawing speed of 30 mm/minute. The welding factor is the quotient of the tensile force at break of the welded sample, divided by the tensile force at break of the non-welded sample.

The invention is illustrated by means of the following examples:

EXAMPLE 1

Completely deionized water, gasoline (boiling point 80° to 110° C.) and finely ground tetrafluoroethylene polymer powder, modified with 300 ppm of perfluoro-(propyl vinyl) ether, were fed continuously, while stirring, to a vertically mounted, cylindrical 30-liter vessel of elongated design equipped with two flow breakers. The water, which had been preheated to 50° C., and the gasoline had previously been homogenized in the line via a static mixer and were introduced via a dip tube into the vicinity of the dispersing disc. The finely ground tetrafluoroethylene polymer powder, the data of which are specified in Table I, was introduced into the vessel from above, via a vibratory chute, from a metering bunker. The ratio of organic liquid to water and of primary powder to organic liquid can be seen in each case in Table I. Three stirring elements, each having a diameter 0.45 times the diameter of the vessel, were located on a common stirrer shaft. In the upper third (the conveying stage) there was a three-bladed propeller stirrer, in the central third there was a so-called dispersing disc, on the circumference of which blade-shaped teeth were mounted on the disc on both sides, and in the lower third there was a double turbine. During the whole test, the stirring energy in this pre-treatment vessel was 29 W/l and the average dwell time was 6 minutes. After being discharged from this pre-treatment vessel, the suspension passed to another vertically mounted, elongated and cylindrical 55-L capacity vessel which had two flow breakers (agglomeration zone) and on the stirrer shaft of which four three-bladed propeller stirrers having a diameter of 0.5 times the diameter of the vessel were mounted at uniform intervals. The stirring power during the test was here 10 W/l. After being discharged from the homogenization zone the suspension then passed into a horizontally mounted, cylindrical vessel of 80 liters capacity and having a length to diameter ratio of 10:1. The stirring element used here was a stirring element mounted on a common shaft and comprising 48 stirrer rings composed in each case of four-bladed disc stirrers having rectangular stirring blades 1 cm wide. The stirring power of this after-treatment zone was 16 W/l. The temperature was kept at 50° C. throughout all the stages of the process. The individual vessels were installed at different heights, so that flow took place under the influence of gravity, and they were connected with one another by short lengths of piping. The vessels were kept at a constant level of filling during the test by adding the components uniformly and continuously and by discharging the suspension from the last stirred vessel to the drying apparatus at a controlled rate. The removal of the gasoline and the water was effected in a multi-stage, continuous drying process, with recovery of the gasoline, temperatures of 260° to 290° C. being used. The powder thus obtained was then conveyed via a cooling zone to a vibratory screen having a mesh width of 1,500 μm, where the removal of the coarse material took place. The properties of the product obtained and also those of the products of the succeeding examples are recorded in Tables II and III.

The variations in the process carried out in Examples 2 to 16 which follow, in respect of starting material (primary powder), temperature, average dwell time and specific stirring energy in the individual stages are shown in Table I. The following additional variations in the experimental condition were carried out in the course of these examples:

EXAMPLES 2, 4, 5 and 6

A double centrifugal stirrer instead of a double turbine was installed in the homogenization zone in the vessel of the pretreatment stage.

EXAMPLE 3

In the vessel of the agglomeration stage there were only three propeller stirrers, mounted at uniform intervals on the stirrer shaft.

EXAMPLE 7

The gasoline and the water were added to the pretreatment stage without premixing; mixing took place solely in the common feed line.

EXAMPLE 9

A recycle line, leading back to the pretreatment stage, branched off the connecting line between the pretreatment stage and the agglomeration stage. At this point 3 parts by volume of the suspended product leaving the pretreatment stage were recycled by means of a pump into this pretreatment stage, while 1 part flowed into the agglomeration stage.

EXAMPLE 11

A double centrifugal stirrer instead of the dispersing disc was installed in the dispersing zone of the pretreatment stage.

EXAMPLE 12

The product was dried at 150° C.

EXAMPLE 14

The product was dried at 160° C.

EXAMPLE 15

Before being metered into the agglomerization process, the primary powder was homogeneously mixed, in the dry state, with 15% by weight of desized glass fibers (average length 50 μm and diameter 15 to 25 μm).

EXAMPLE 16

Before the agglomerization process, the primary powder was homogeneously mixed with 10% by weight of charcoal powder (as specified in DIN 80).

TABLE I

| Example No. | Organic liquid Nature of liquid | Ratio by volume between organic liquid and water | Type (quantity of modifying agent in ppm)*** | Weight/volume ratio of primary powder/organic liquid | $d_{50}$ (μm) | Bulk density (g/l) | Stage (a) Temperature (°C.) | Average dwell time (minutes) | Specific stirring energy (W/l) |
|---|---|---|---|---|---|---|---|---|---|
| 1 | gasoline* | 1:14 | 300 | 2.5:1 | 50 | 425 | 50 | 6 | 29 |
| 2 | " | 1:11 | 300 | 2.0:1 | 50 | 380 | 22 | 6 | 29 |
| 3 | " | 1:14 | 300 | 2.5:1 | 40 | 380 | 50 | 6 | 29 |
| 4 | " | 1:17 | 200 | 4.0:1 | 30 | 350 | 25 | 6 | 29 |
| 5 | " | 1:17 | 300 | 3.3:1 | 40 | 380 | 45 | 6 | 10 |
| 6 | " | 1:11 | Homopolymer | 2.0:1 | 60 | 420 | 24 | 6 | 29 |
| 7 | " | 1:8 | 300 | 2.5:1 | 40 | 380 | 24 | 10 | 10 |
| 8 | " | 1:25 | Homopolymer | 3.7:1 | 55 | 400 | 38 | 12 | 10 |
| 9 | " | 1:14 | 300 | 2.5:1 | 35 | 380 | 50 | 6 | 29 |
| 10 | " | 1:11 | 1000 | 2.0:1 | 25 | 450 | 50 | 6 | 29 |
| 11 | " | 1:11 | Homopolymer | 2.0:1 | 35 | 420 | 20 | 6 | 29 |
| 12 | Perchloroethylene | 1:11 | 300 | 1.8:1 | 40 | 380 | 50 | 6 | 29 |
| 13 | gasoline** | 1:12 | 300 | 2.5:1 | 40 | 350 | 75 | 6 | 29 |
| 14 | Trifluoro-trichloro-ethane | 1:10 | 300 | 2.0:1 | 40 | 390 | 15 | 6 | 29 |
| 15 | gasoline* | 1:10 | 300 | 2,5:1 | 50 | 300 | 50 | 6 | 29 |
| 16 | " | 1:10 | 300 | 2,7:1 | 30 | 390 | 50 | 6 | 29 |

| Example No. | Stage (b) Temperature (°C.) | Average dwell time (minutes) | Specific stirring energy (W/l) | Stage (c) Temperature (°C.) | Average dwell time (minutes) | Specific stirring energy (W/l) |
|---|---|---|---|---|---|---|
| 1 | 50 | 9 | 10 | 50 | 12 | 16 |
| 2 | 22 | 9 | 10 | 22 | 12 | 23 |
| 3 | 50 | 9 | 3 | 50 | 12 | 16 |
| 4 | 25 | 9 | 12 | 25 | 12 | 25 |
| 5 | 45 | 9 | 2 | 30 | 12 | 5.5 |
| 6 | 35 | 9 | 5 | 40 | 12 | 5.5 |
| 7 | 30 | 13 | 10 | 30 | 18 | 20 |
| 8 | 40 | 18 | 10 | 40 | 24 | 20 |
| 9 | 50 | 9 | 5 | 50 | 12 | 16 |
| 10 | 50 | 9 | 10 | 50 | 12 | 16 |
| 11 | 50 | 9 | 10 | 50 | 12 | 16 |
| 12 | 50 | 9 | 5 | 50 | 12 | 16 |
| 13 | 75 | 9 | 5 | 75 | 12 | 16 |
| 14 | 15 | 9 | 5 | 15 | 12 | 16 |
| 15 | 50 | 9 | 5 | 50 | 12 | 16 |

TABLE I-continued

| | | | | | | |
|---|---|---|---|---|---|---|
| 16 | 50 | 9 | 5 | 50 | 12 | 16 |

*Boiling point 80 to 110
**Boiling point 170 to 200
***Perfluoro-(propyl-vinyl)ether

TABLE II

| Example No. | $d_{50}$ ($\mu$m) | Bulk density (g/l) | Coarse fraction >1,500 $\mu$m removed (% by weight) | Flow time (seconds/50 g) | Particle stability (seconds/50 g) | Proportion between 0.7 times and 1.3 times $d_{50}$ (% by weight) |
|---|---|---|---|---|---|---|
| 1 | 380 | 880 | 3.1 | 2.5 | 2.5 | 52 |
| 2 | 900 | 780 | 3.8 | 3.0 | 4.0 | 50 |
| 3 | 360 | 890 | <0.1 | 2.4 | 2.7 | 53 |
| 4 | 180 | 760 | 0.2 | 8 | 8 | 52 |
| 5 | 215 | 740 | 0.3 | 8 | 7 | 51 |
| 6 | 750 | 740 | 3.5 | 2.7 | 3.0 | 51 |
| 7 | 395 | 805 | 0.8 | 3.1 | 3.2 | 55 |
| 8 | 250 | 830 | 0.4 | 3.8 | 3.5 | 47 |
| 9 | 395 | 880 | 0.2 | 2.7 | 2.6 | 53 |
| 10 | 280 | 810 | <0.1 | 2.1 | 2.9 | 62 |
| 11 | 370 | 850 | 1.1 | 2.3 | 2.6 | 42 |
| 12 | 400 | 850 | 0.3 | 2.1 | 2.2 | 61 |
| 13 | 700 | 840 | 1.4 | 1.9 | 2.5 | 62 |
| 14 | 710 | 790 | 1.6 | 2.7 | 3.5 | 60 |
| 15 | 700 | 795 | 1.4 | 2.5 | 2.8 | 61 |
| 16 | 460 | 720 | 0.8 | 3.0 | 3.0 | 52 |

TABLE III

| Example No. | Welding factor | Pore count (Number of pores/$n^2$) | Deformation under load (%) | Shear viscosity GPa s | $\Delta H_u$ | $\Delta H_s$ | Crystallite thickness |
|---|---|---|---|---|---|---|---|
| 1 | 1.00 | 5 | 13 | 78 | 0.10 | 0.73 | 975 |
| 2 | 0.90 | 6 | 12 | 72 | 0.11 | 0.70 | 960 |
| 3 | 1.00 | 4 | 13 | 50 | 0.10 | 0.73 | 975 |
| 4 | 0.95 | 5 | 12 | 55 | 0.12 | 0.71 | 1,100 |
| 5 | 0.97 | 6 | 13 | 80 | 0.10 | 0.74 | 950 |
| 6 | 0.70 | 8 | 14 | 500 | 0.17 | 0.55 | 1,950 |
| 7 | 0.85 | 3 | 12 | 75 | 0.11 | 0.73 | 920 |
| 8 | 0.73 | 5 | 13 | 630 | 0.17 | 0.51 | 1,850 |
| 9 | 1.00 | 4 | 13 | 46 | 0.10 | 0.73 | 975 |
| 10 | 1.00 | 2 | 9 | 24 | 0.12 | 0.73 | 500 |
| 11 | 0.70 | 7 | 15 | 704 | 0.18 | 0.54 | 2,000 |
| 12 | 0.80 | 5 | 13 | 85 | 0.11 | 0.70 | 960 |
| 13 | 0.81 | 4 | 12 | 75 | 0.10 | 0.73 | 980 |
| 14 | 0.90 | 6 | 13 | 83 | 0.11 | 0.70 | 950 |
| 15 | 0.95 | 8 | 12 | 78 | 0.10 | 0.73 | 975 |
| 16 | 0.85 | 3 | 12 | 65 | 0.11 | 0.71 | 910 |

We claim:

1. An agglomerated powder suitable for use in a molding powder containing particles of a non-melt-fabricable tetrafluoroethylene polymer having a specific surface area of 0.5 to 4 m$^2$/g as measured by the BET method the agglomerates thereof consisting of:
   (a) said tetrafluoroethylene polymer consisting of 0.001 to 1% by weight of copolymerized units of a perfluorinated vinyl ether of the formula

in which X denotes a perfluoroalkyl radical having 1 to 4 C atoms or a radical of the formula

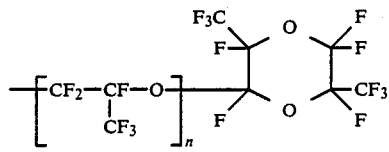

and n is 0 to 1, and of copolymerized units of tetrafluoroethylene,
   (b) a particulate form having an average particle diameter $d_{50}$ of 150 to 1,000 $\mu$m which has been built up from primary particles having an average particle diameter $d_{50}$ of 20 to 80 $\mu$m and which possess a spheroidal form and a uniform, dense surface,
   and said agglomerated power having:
   (c) a bulk density of 800 to 1000 g/l,
   (d) a power flow time of 8.0 to 4.0 seconds/50 g at an average agglomerate diameter $d_{50}$ of 150 to 250 $\mu$m and of 4.0 to 1.5 seconds/50 g at an agglomerate diameter $d_{50}$ of 250 to 1,000 $\mu$m,
   (e) a particle stability of 8.0 to 4.0 seconds/50 g at an average agglomerate diameter $d_{50}$ of 150 to 250 $\mu$m and of 4.0 to 1.8 seconds/50 g at an agglomerate diameter $d_{50}$ of 250 to 1,000 $\mu$m, and
   (f) a proportion of 50 to 75% by weight of agglomerates with a particle size diameter which is at least 0.7 times and not more than 1.3 times the average particle diameter $d_{50}$, (g) wherein a molded article prepared from said agglomerated powder has a welding factor of 0.6 to 1.0, and (h) the pore count, measured at a voltage of 5,000 V as electrical defects on a veneer-cut film 200 μm thick prepared from the agglomerated powder, is not more than 15 to 0 pores/m².

2. An agglomerated powder as claimed in claim 1 in which said tetrafluoroethylene polymer consists of 0.01 to 0.5 % by weight of copolymerized units of a perfluorinated vinyl ether of the formula

in which X denotes a perfluoroalkyl radical having 1 to 4 C atoms or a radical of the formula

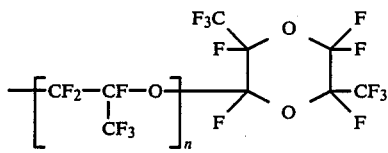

and n is 0 to 1, and of copolymerized units of tetrafluoroethylene.

3. An agglomerated powder as claimed in claim 1, the agglomerates of which have an average particle diameter $d_{50}$ of 150 to 800 μm which have been built up from primary particles having an average particle diameter $d_{50}$ of 20 to 80 μm and which possess a spheroidal form and a uniform, dense surface.

4. An agglomerated powder as claimed in claim 1, which has a flow time of 6.0 to 3.0 seconds/50 g at an average agglomerate diameter $d_{50}$ of 150 to 250 μm and of 3.0 to 1.5 seconds/50 g at an agglomerate diameter $d_{50}$ of 250 to 1,000 μm.

5. An agglomerated powder as claimed in claim 1 which has a particle stability of 6.0 to 3.0 seconds/50 g at an average agglomerate diameter $d_{50}$ of 150 to 250 μm and of 3.0 to 1.8 seconds/50 g at an agglomerate diameter of $d_{50}$ of 250 to 1,000 μm.

6. An agglomerated powder as claimed in claim 1, wherein a molded article prepared from said agglomerated powder has a welding factor of 0.8 to 1.0.

7. An agglomerated powder as claimed in claim 1, wherein the pore count, measured at a voltage of 5,000 V as electrical defects on a veneer-cut film 200 μm thick prepared from the agglomerated powder, is 6 to 0 pores/m².

8. An agglomerated powder as claimed in claim 1, wherein the copolymerized units of the perfluorinated vinyl ether are units of perfuoro-(n-propyl-vinyl)ether.

9. An agglomerated tetrafluoroethylene co-polymer powder having a specific surface area as measured by the BET method, of 0.5 to 4 m²/g, suitable for use in a molding powder, the agglomerates of which were obtained by continuously introducing a polytetrafluoroethylene co-polymer primary powder having an average particle diameter $d_{50}$ of 20 to 80 μm, together with a liquid medium into a staged cascade process in which (1) said primary powder is pre-agglomerated to an average particle diameter $d_{50}$ of about 100 to about 400 μm, (2) the resulting pre-agglomerated primary powder is passed through an agglomeration stage in which the resulting pre-agglomerated powder is further agglomerated to a tertiary powder having tertiary particles of an average diameter $d_{50}$ of 150 to 1000 μm, and (3) said tertiary powder is passed through and discharged continually from an after-treatment stage in which the final formation of the particle shape takes place without a further essential change in the average particle size; said agglomerates having said average particle diameter $d_{50}$ of 150 to 1000 μm, and being built up essentially from said primary powder, and possessing a spherical form and an uniform, dense surface; said co-polymer of said agglomerated tetrafluoroethylene copolymer powder having been obtained by copolymerizing polytetrafluoroethylene with 0.001 to 1% by weight of a perfluorinated vinyl ether of the formula

in which X denotes a perfluoroalkyl radical having 1 to 4 C atoms or a radical of the formula

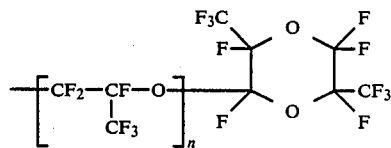

and n is 0 to 1;
and said agglomerated tetrafluoroethylene copolymer power having:

(c) a bulk density of 800 to 1000 g/l, (d) a powder flow time of 8.0 to 4.0 seconds/50 g at an average agglomerate diameter $d_{50}$ of 150 to 250 μm and of 4.0 to 1.5 seconds/50 g at an agglomerate diameter $d_{50}$ of 250 to 1,000 μm, (e) a particle stability of 8.0 to 4.0 seconds/50 g at an average agglomerate diameter $d_{50}$ of 150 to 250 μm and of 4.0 to 1.8 seconds/50 g at an agglomerate diameter $d_{50}$ of 250 to 1,000 μm, and (f) a proportion of 50 to 75% by weight of agglomerates with a particle size diameter which is at least 0.7 times and not more than 1.3 times the average particle diameter $d_{50}$, (g) wherein a molded article prepared from said agglomerated tetrafluoroethylene copolymer powder has a welding factor of 0.6 to 1.0, and (h) the pore count, measured at a voltage of 5,000 V as electrical defects on a veneer-cut film 200 μm thick prepared from the agglomerated tetrafluoroethylene copolymer powder, is not more than 15 to 0 pores/m².

10. A granular, agglomerated form of non-melt-fabricable polytetrafluoroethylene copolymer primary particles, said agglomerated form being useful in molding powders, said primary particles having been obtained by suspension polymerization of tetrafluorethylene adn 0.001 to 1% by weight of perfluorinated vinyl ether and having a specific surface area of 0.5 to 4 m²/g, as measured by the BET method, and a particle diameter $d_{50}$ of 20 to 80 μm, said perfluorinated vinyl ether having the formula

in which X denotes a perfluoroalkyl radical having 1 to 4 C atoms or a radical of the formula

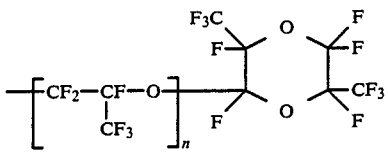

the agglomerates of said granular, agglomerated form of the said primary particles having a spheroidal form and a uniform, dense surface, and a mass of the agglomerates having:
(a) an average particle diameter $d_{50}$ of 150 to 1000 $\mu m$, the agglomerates of said average particle diameter $d_{50}$ having been built up from the primary particles having an average particle diameter $d_{50}$ of 20 to 80 $\mu m$;
(b) a bulk density of 800 to 1000 g/l;
(c) a powder flow time of 8.0 to 4.0 seconds/50 g at an average agglomerate diameter $d_{50}$ of 150 to 250 $\mu m$ and of 4.0 to 1.5 seconds/50 g at an agglomerate diameter $d_{50}$ of 1,000 $\mu m$;
(d) a particle stability of 8.0 to 4.0 seconds/50 g at an average agglomerate diameter $d_{50}$ of 150 to 250 $\mu m$ and of 4.0 to 1.8 seconds/50 g at an agglomerate diameter $d_{50}$ to 1,000 $\mu m$; and
(e) a proportion of 50 to 75% by weight of agglomerates with a particle size diameter which is at least 0.7 times and not more than 1.3 times the average particle diameter $d_{50}$;
a molded article prepared from a molding powder consisting of said agglomerates having a welding factor of 0.6 to 1.0; and
a veneer-cut film 200 $\mu m$ thick prepared from a molding powder consisting of said agglomerates having a pore count, measured at a voltage of 5,000 v as electrical defects in said film, which is not more than 15 pores/m² to 0 pores/m².

11. A molding power consisting of said granular, agglomerated form of said primary particles as claimed in claim 10.

12. A molding powder consisting of the agglomerated powder of claim 1.

13. A molding powder consisting of the agglomerated tetrafluoroethylene copolymer powder of claim 9.

* * * * *